United States Patent [19]

Yoda et al.

[11] Patent Number: 5,155,651
[45] Date of Patent: Oct. 13, 1992

[54] LEVITATOR WITH ROTATION CONTROL

[75] Inventors: Shinichi Yoda, Tokyo; Kenji Itoga, Hyogo; Souichiro Okuda, Hyogo; Kazunori Ikegami, Hyogo, all of Japan

[73] Assignees: National Space Development Agency of Japan; Mitsubishi Denki Kabushiki Kaisha, both of Japan

[21] Appl. No.: 815,837

[22] Filed: Dec. 30, 1991

Related U.S. Application Data

[63] Continuation of Ser. No. 446,005, Dec. 5, 1989, abandoned.

[30] Foreign Application Priority Data

Dec. 7, 1988 [JP] Japan .................. 63-309673
Dec. 7, 1988 [JP] Japan .................. 63-309674
Dec. 7, 1988 [JP] Japan .................. 63-309675
Dec. 1, 1989 [JP] Japan .................. 1-23495

[51] Int. Cl.$^5$ ............................ H02N 15/00
[52] U.S. Cl. ...................... 361/144; 361/147; 73/505; 219/7.5; 335/306
[58] Field of Search .......... 361/143, 144, 147, 233; 244/158 R, 171; 335/306; 373/138, 139, 140; 219/7.5; 73/505

[56] References Cited

U.S. PATENT DOCUMENTS

| | | | |
|---|---|---|---|
| 3,815,000 | 6/1974 | Phillips et al. | 361/233 |
| 4,393,706 | 6/1983 | Barmatz | 73/505 |
| 4,420,977 | 12/1983 | Elleman et al. | 73/505 |
| 4,874,346 | 10/1989 | Wachspress | 310/90.5 |

OTHER PUBLICATIONS

"Development of an electrostatic positioner for space material processing", W. K. Rhim, M. Collender, M. T. Hyson, W. T. Simms, and D. D. Elleman, Rev. Sci. Instrum. 56(2), Feb. 1985, pp. 307-317.

Primary Examiner—Jeffrey A. Gaffin
Attorney, Agent, or Firm—Wolf, Greenfield & Sacks

[57] ABSTRACT

A levitator which is mounted on a space station; for example, for use in material science experiments in space. The levitator has a position detector for detecting the position of a sample, a variable power supply whose output voltage varies in accordance with the signal output from the position detector, a pair of planar electrodes connected to two ends, respectively, of the variable power supply and disposed in opposing relation to each other, and a ring electrode disposed so as to surround each of the planar electrodes and to which is applied a higher voltage than that applied to the corresponding planar electrode from a DC power supply, thereby holding the sample stationary at a desired position by means of the planar and ring electrodes. The levitator further has a means for rotating the sample being held stationary. Thus, it is possible to rotate the sample in a controlled manner and hence possible to carry out an experiment in which the sample is uniformly heated in a microgravity environment.

31 Claims, 9 Drawing Sheets

LEVITATOR WITH ROTATION CONTROL

This is a continuation of copending application Ser. No. 07/446,005 filed on Dec. 5, 1989 now abandoned.

BACKGROUND OF THE INVENTION

1. Field of the Invention

The present invention relates to a levitator which may be mounted on a space station, for example, for use in material science experiments in space.

2. Description of the Related Art

FIG. 1 shows the arrangement of a prior art disclosed in W. K. Rhim, M. Collender, M. T. Hyson, W. T. Simms, and D. D. Elleman, "Development of an electrostatic positioner for space material processing", Rev. Sci. Instrum., 56, February 1985, pp. 307-317). In the figure, the reference numeral 1 denotes a charged sample, 2 a position detector for detecting the position of the sample 1, and 3 a variable power supply whose output voltage varies in accordance with the signal output from the position detector 2. The reference numerals 4a and 4b denote a pair of planar electrodes which are connected to two ends, respectively, of the variable power supply 3 and disposed in opposing relation to each other, 5a, 5b DC power supplies, and 6a, 6b ring electrodes each of which is disposed so as to surround a corresponding planar electrode 4a or 4b and to which a higher voltage is applied than that applied to the corresponding planar electrode from the DC power supply 5a (5b).

In operation, the position of the positively charged sample 1 is constantly monitored by the position detector 2 and the output of the variable power supply 3 is controlled so that the sample 1 is kept equidistant between the upper and lower electrodes in the vertical direction as viewed in the figure. Since higher voltages than those applied to the planar electrodes 4a and 4b are applied to the ring electrodes 6a and 6b, the sample 1 is also held stationary in the horizontal direction as viewed in FIG. 1.

Thus, an experiment, for instance, in which the sample 1 held in this way is heated by irradiation with light or the like can, for example, be carried out at a space station.

The conventional levitator arranged as described above suffers, however, from the following problems. Since the prior art merely controls the position of the sample through the planar and ring electrodes, it is incapable of rotating the sample in a controlled manner to heat it uniformly. In addition, the prior art is incapable of preventing a microgravity condition, which is a significant feature of material science experiments in space, from being destroyed by the spontaneous rotation of the sample itself due to convection, for instance.

SUMMARY OF THE INVENTION

Under these circumstances, it is a primary object of the present invention to provide a levitator which is capable of rotating the sample in a controlled manner and hence uniformly heating the sample in a microgravity environment for experimental purposes.

To this end, the present invention provides a levitator having a position detector for detecting the position of a sample, a variable power supply whose output voltage varies in accordance with the signal output from the position detector, a pair of planar electrodes connected to two ends, respectively, of the variable power supply and disposed in opposing relation to each other, and a ring electrode disposed so as to surround each of the planar electrodes and to which is applied a higher voltage than that applied to the corresponding planar electrode from a DC power supply, thereby holding the sample stationary at a desired position by means of the planar and ring electrodes, wherein the ring electrode is divided into a plurality of circular electrodes and an alternating power supply whose output voltage changes periodically is connected to each pair of adjacent circular electrodes.

Thus, the divided ring electrodes, that is, the circular electrodes, serve both as a mechanism for holding the sample stationary in the horizontal direction and as a mechanism for rotating the sample in a controlled manner. It is therefore possible to prevent spontaneous rotation of the sample and also to rotate the sample in a controlled manner by applying an alternating electric field to each pair of adjacent circular electrodes from the alternating power supply.

In another embodiment of the present invention, at least one electromagnet is disposed at a predetermined position outside the ring electrode and the sample is rotated in a controlled manner by means of the magnetic field produced from the electromagnet.

By changing the magnetic field distribution by utilizing the law of electromagnetic induction by electromagnets, a current is generated in the sample and the sample is rotated in a controlled manner by way of the interaction between the current and the magnetic field.

In still another embodiment of the present invention, there is provided an irradiator which irradiates a levitated sample with a plurality of high-output beams from different directions to apply only rotational force to the sample.

High-output beams output from the irradiator are applied to a levitated sample from a plurality of directions, thereby applying rotational force to the sample. In this case, rotational force alone is applied to the sample by the irradiation with the high-output beams but no force for linear movement is applied to the sample.

In a further embodiment of the present invention, there is provided a permanent magnet which is driven so as to rotate while applying a magnetic field to the space in which the sample is located.

As the permanent magnet that applies a magnetic field to the space including the sample is rotated, eddy current is generated in the sample and this eddy current and the magnetic field interact with each other to cause Lorentz's force to act on the sample in the same direction as the direction of rotation of the permanent magnet, thus causing the sample to rotate.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Figure 1:
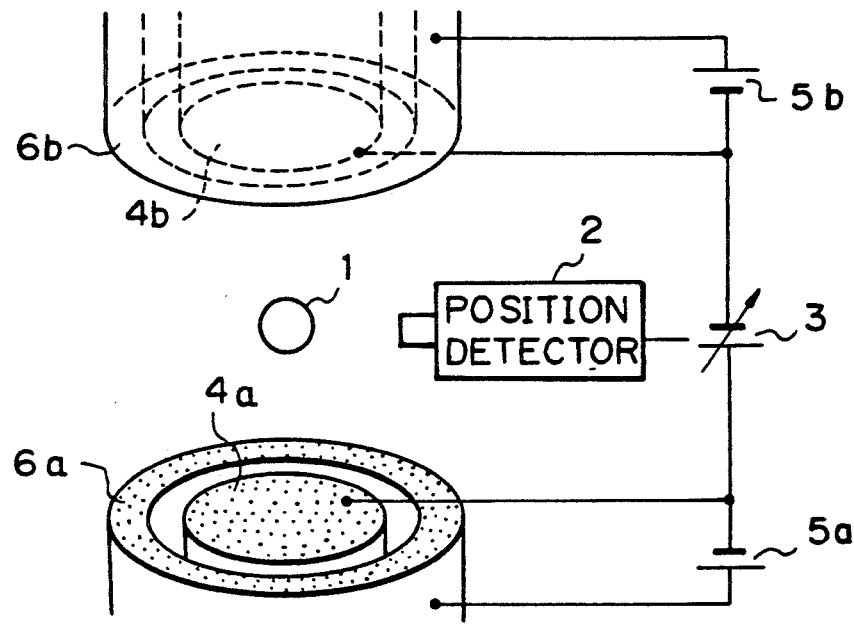
FIG. 1 shows the arrangement of a conventional levitator.
Figure 2:
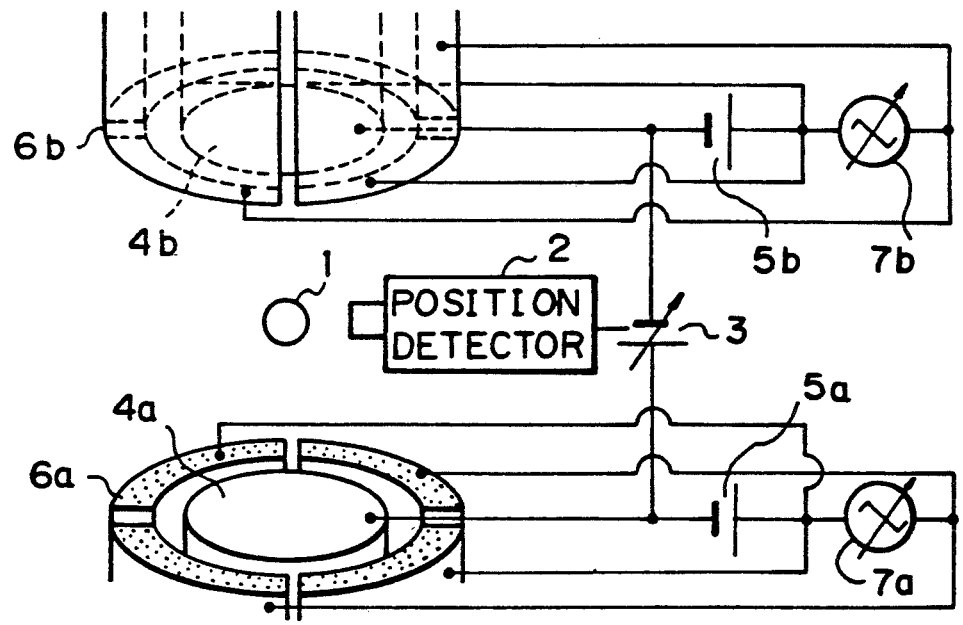
FIG. 2 shows the arrangement of one embodiment of the levitator according to the present invention.

One embodiment of the present invention will be described below with reference to FIG. 2, in which the same elements as those shown in FIG. 1 are denoted by the same reference numerals. In FIG. 2, the reference numerals 7a and 7b denote alternating power supplies which are connected in series to the DC power supplies 5a and 5b, respectively, and 6 a ring electrode which is disposed so as to surround each of the planar electrodes 4a and 4b, the electrode 6 comprising four arc shaped electrodes. Each pair of adjacent circular electrodes are connected to the opposite poles, respectively, of the corresponding one of the alternating power supplies 7a and 7b.

The peak value of voltage of the alternating power supplies 7a and 7b is set so as to be lower than the output voltage of the DC power supplies 5a and 5b.

In operation, the position of the sample 1 positively charged is constantly monitored by the position detector 2 and the output of the variable power supply 3 is controlled so that the sample 1 is kept equidistant between the upper and lower electrodes in the vertical direction as viewed in the figure. Since the voltage applied to the ring electrode 6 is higher than that applied to the planar electrode 4 even when the output of the alternating power supply 7 is at its lowest, the sample 1 is also held stationary in the horizontal direction as viewed in the figure.

In addition, the rotation of the sample 1 can be controlled by properly adjusting the frequency and voltage of the alternating power supply 7. Since the charge on the sample surface rotates together with the sample 1, it is possible to obtain stable rotary motion which is synchronous with the frequency of the alternating power supply 7. Assuming that the number of circular electrodes constituting in combination the ring electrode 6 is n and the frequency of the alternating power supply 7 is f, the sample 1 rotates at a number of revolutions expressed by nf.

Thus, an experiment in which the sample 1 held in this way is heated by irradiation with light or the like can be effectively carried out at a space station, for instance.

Although in the foregoing embodiment a ring electrode is divided into a plurality of circular electrodes to serve as both a mechanism for holding the sample stationary in the horizontal direction and a mechanism for rotating the sample in a controlled manner, it should be noted that the same advantageous effect can be obtained by separately disposing electrodes for rotation control and independently connecting alternating power supplies to these electrodes.

Although in the foregoing embodiment a plurality of circular electrodes constituting a ring electrode are cyclically disposed, these electrodes need not be arranged in a strictly cyclical manner.

Another embodiment of the present invention will next be explained with reference to FIGS. 3, 4(A) and 4(B).

Figure 3:
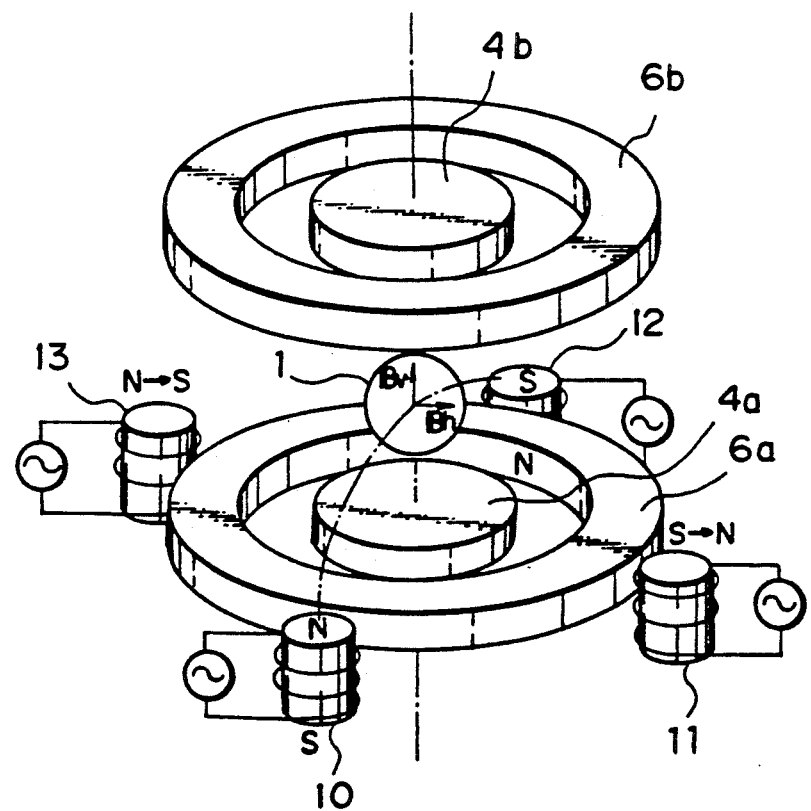
FIG. 3 schematically shows the arrangement of another embodiment of the levitator according to the present invention.
Figure 4:
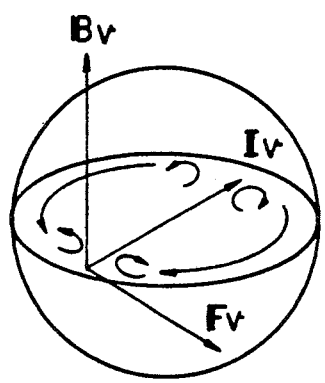
FIGS. 4(A) and 4(B) show the relationship between the magnetic field and the force acting on the sample in the second embodiment.
Figure 4:
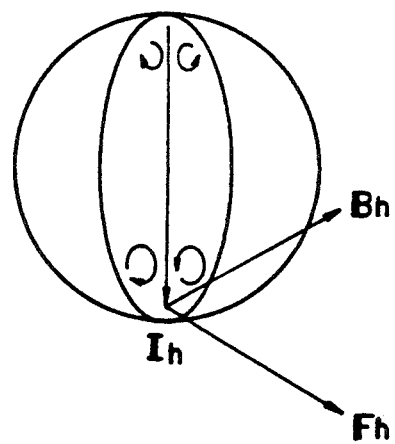

FIG. 3 schematically shows the arrangement of the second embodiment of the levitator according to the present invention, and FIGS. 4(A) and 4(B) show the relationship between the magnetic field and the force acting on the sample shown in FIG. 3. Referring to these figures, the levitator according to this embodiment has electromagnets 10, 11, 12 and 13 for rotation which are respectively comprised of four equally spaced solenoid coils disposed at respective positions around one ring electrode 6a.

The following is a description of the operation of the levitator according to this embodiment arranged as described above.

The electrodes 4a, 4b, 6a and 6b and the operation of holding the sample 1 stationary are the same as those in the prior art.

With the sample 1 being levitated and held stationary between the disk electrodes 4a and 4b, the electromagnets 10, 11, 12 and 13 are respectively fed with AC currents which have the same period and the same amplitude and are 90° out of phase with each other. FIGS. 4(A) and 4(B) show the force acting on the sample 1 when the N pole is formed at the upper end of the electromagnet 10, the S pole is formed at the upper end of the electromagnet 12, the electromagnet 11 is in a transient state from the S pole to the N pole at the upper end and the electromagnet 13 is in a transient state from the N pole to the S pole at the upper end, as shown in FIG. 3.

Referring to FIGS. 4(A) and 4(B), the overall magnetic field that is generated from the electromagnets 10, 11, 12 and 13 may be decomposed into two components, that is, the component Bv in the vertical direction and the component Bh in the horizontal direction which intersects the electromagnets 10 and 11. The arrows in these figures express eddy currents locally induced by the changing magnetic fields Bv and Bh. The overall eddy current may be decomposed into two components, that is, the current Iv in the vertical direction and the current Ih in the horizontal direction.

In accordance with the law of electromagnetic induction, the interaction between Bv and Iv produces the force Fv, while the interaction between Bh and Ih produces the force Fh, which forms a rotational force.

Figure 5:
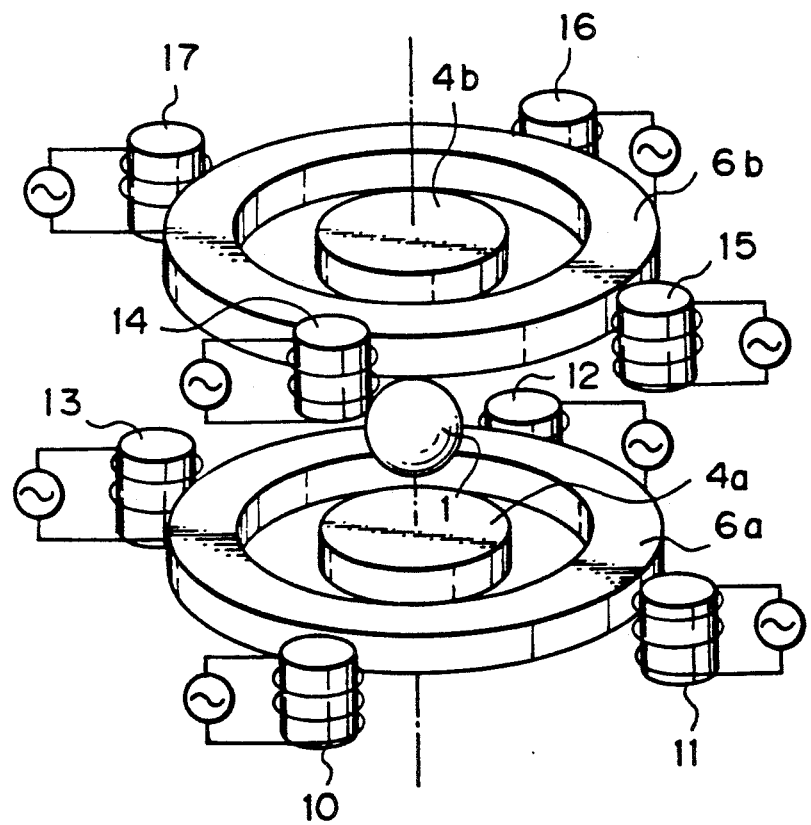
FIG. 5 schematically shows the arrangement of another form of the second embodiment.

Although in the foregoing embodiment four electromagnets are disposed in the horizontal plane, it should be noted that, if eight electromagnets are employed as shown in FIG. 5 and among them four appropriate electromagnets, e.g., the electromagnets 10, 13, 14 and 17, are combined together, it is also possible to rotate the sample 1 in the vertical direction. If the electromagnets 10, 13, 15 and 16 are combined together, the sample 1 can be rotated in a 45° inclined plane.

Although in the foregoing embodiments four or eight electromagnets are provided, the number of electromagnets employed may be one or any plural number other than four or eight.

Although in the foregoing embodiments electromagnets are disposed around a ring electrode, these electromagnets may be disposed between the disk electrode and the ring electrode.

Although in the foregoing embodiments disk and ring electrodes are provided, either disk or ring electrodes alone may be provided.

Figure 6:
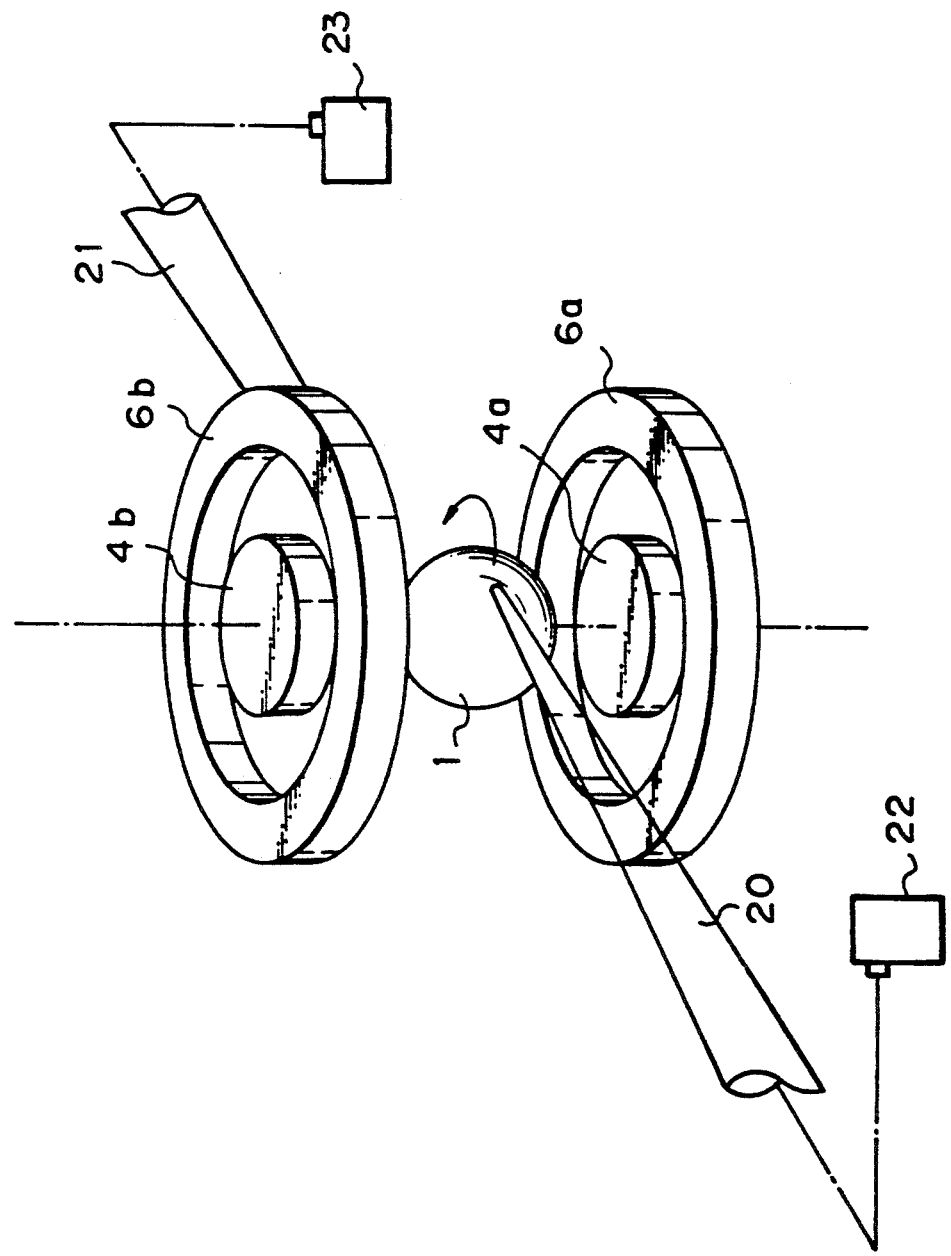
FIG. 6 schematically shows the arrangement of still another embodiment of the levitator according to the present invention.

Still another embodiment of the present invention will next be explained with reference to FIG. 6, in which the same reference numerals as those shown in FIG. 1 denote the same or corresponding elements. The reference numerals 20 and 21 denote laser beams which are applied to the sample 1 from different directions to apply only rotational force to the sample 1. The reference numerals 22 and 23 denote laser oscillators for outputting the laser beams 20 and 21, respectively, the laser oscillators 22 and 23 being arranged such that the respective focal lengths and irradiation positions of the laser beams 20 and 21 can be adjusted as desired. For example, the laser oscillators 22 and 23 are adjusted so that the laser beams 20 and 21 having the same output level are applied to two irradiation points, respectively, which are in symmetry with each other with respect to the center of gravity of the sample 1 and are applied in mutually opposing directions which are close to the tangential lines of the sample 1 to the two symmetrical points.

With the sample 1 being levitated and held stationary in the same way as in the prior art, one irradiation point on the sample 1 is irradiated with the laser beam 20 from the laser oscillator 22 in a direction which is close to the tangential line of the sample 1 at this irradiation point. In addition, another irradiation point which is in symmetry with the first irradiation point with respect to the center of gravity of the sample 1 is irradiated with the laser beam 21 from the laser oscillator 23 in a direction which is opposite to the direction of the laser beam 20 and which is close to the tangential line of the sample 1 at the second irradiation position. In consequence, the sample 1 is rotated around its vertical by the laser beams 20 and 21 axis without changing its position thereof. In other words, the sample 1 is rotated by the laser beams 20 and 21 but no force for linear movement is applied to the sample 1.

It should be noted that, if the laser oscillators 22 and 23 are adjusted so that the laser beams 20 and 21 are applied to the lower and upper sides, respectively, of the sample 1, then the sample 1 can be rotated around its horizontal axis. It is possible to rotate the sample 1 in any direction desired by a method similar to the above.

Thus, the sample 1 is forced to rotate in any direction desired by irradiation with the two laser beams 20 and 21, thereby enabling the direction of the sample 1 to be changed as desired.

Although in the foregoing embodiment two laser beams 20 and 21 are employed, three or more laser beams may also be employed. In the above-described embodiment, the present invention is applied to an electrostatic levitator, but it may similarly be applied to an electromagnetic levitator; in such a case also, the same advantages as those realized in the foregoing embodiment are obtained. Although in the foregoing embodiment the laser beams 20 and 21 are employed as high-output beams for applying rotational force to the sample 1, other high-output beams, for example, charged particle beams, may also be employed to obtain the same effects.

Figure 7:
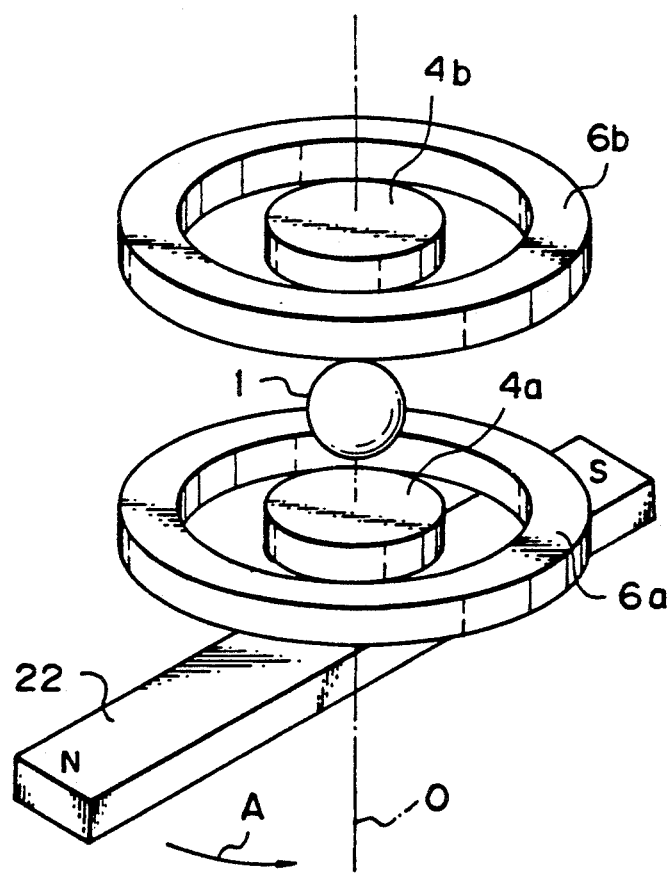
FIG. 7 shows the arrangement of a further embodiment of the levitator according to the present invention.

FIG. 7 shows a further embodiment of the present invention, in which the same reference numerals as those in FIG. 1 denote the same or corresponding elements. The reference numeral 22 denotes a permanent bar magnet which is disposed so as to intersect at right angles with the mutual central axis O of electrodes 4a, 4b, 6a and 6b and in bisymmetry with respect to the central axis O, the permanent magnet 22 being driven to rotate around the central axis O by a driving means (not shown).

While the sample 1 is being levitated and held stationary, the permanent magnet 22 is rotated, for instance, in the direction of the arrow A shown in FIG. 7. In consequence, the sample 1 rotates in the same direction as the direction of rotation of the permanent magnet 22 in accordance with the law of electromagnetic induction.

Figure 8:
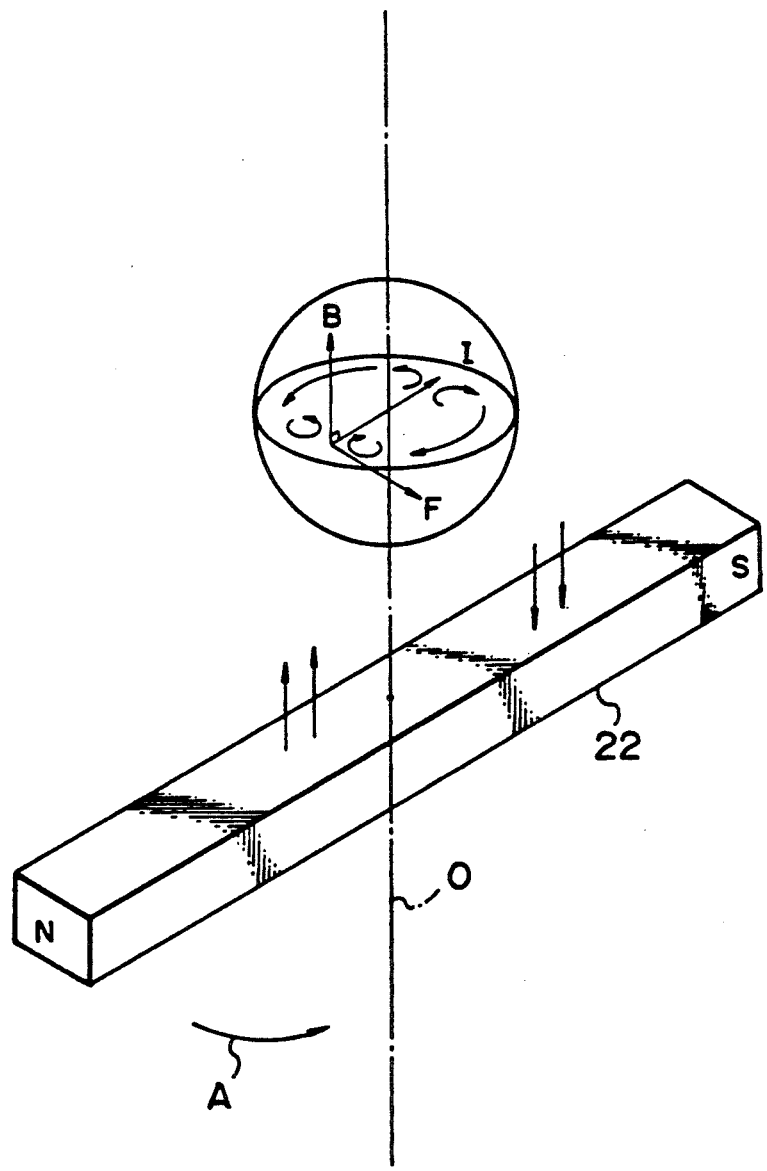
FIG. 8 shows the rotational force acting on the sample by rotation of the permanent magnet shown in FIG. 7.

FIG. 8 shows the force acting on the sample 1 by the action of magnetic induction, in which $\vec{B}$ denotes the direction of magnetic field of the permanent magnet 22, $\vec{I}$ the current component, among the eddy currents generated as a result of the change in magnetic field of the permanent magnet 22, which produces rotational force, and $\vec{F}$ the force acting on the sample 1 by interaction between the eddy current $\vec{I}$ and the magnetic field $\vec{B}$. It should be noted that the action of electromagnetic induction in this case is considered on the equator of the sample 1.

Figure 9:
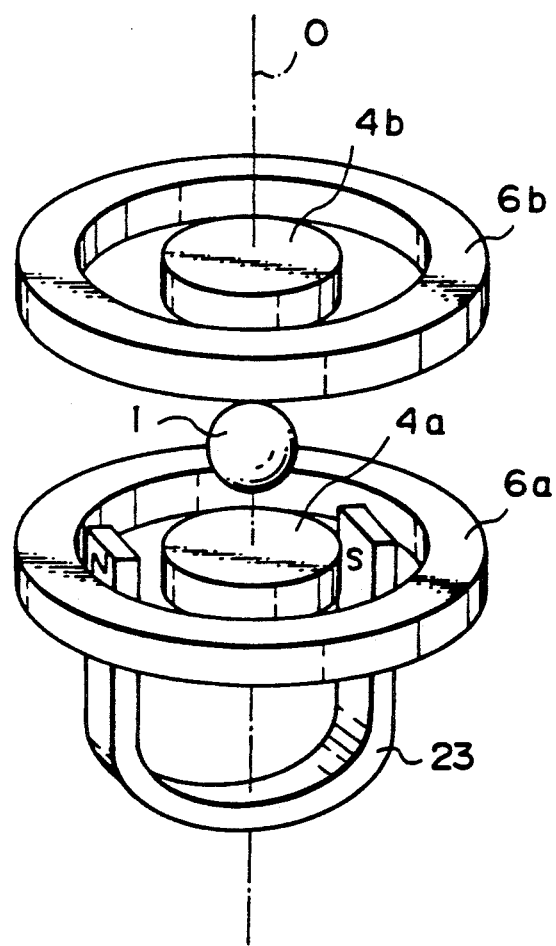
FIG. 9 shows another form of the embodiment shown in FIG. 7.

FIG. 9 shows another form of the embodiment shown in FIG. 7, in which a U-shaped permanent magnet 23 is employed in place of the permanent bar magnet 22 and the permanent magnet 23 is disposed between the disk electrode 4a and the ring electrode 6a so as to rotate around the central axis O. In this case also, it is possible to obtain the same advantages as those realized in the foregoing embodiment. Although in the arrangement shown in FIG. 9 the permanent magnet 23 is disposed between the two electrodes 4a and 6a, it may be disposed outside the ring electrode 6a.

Figure 10:
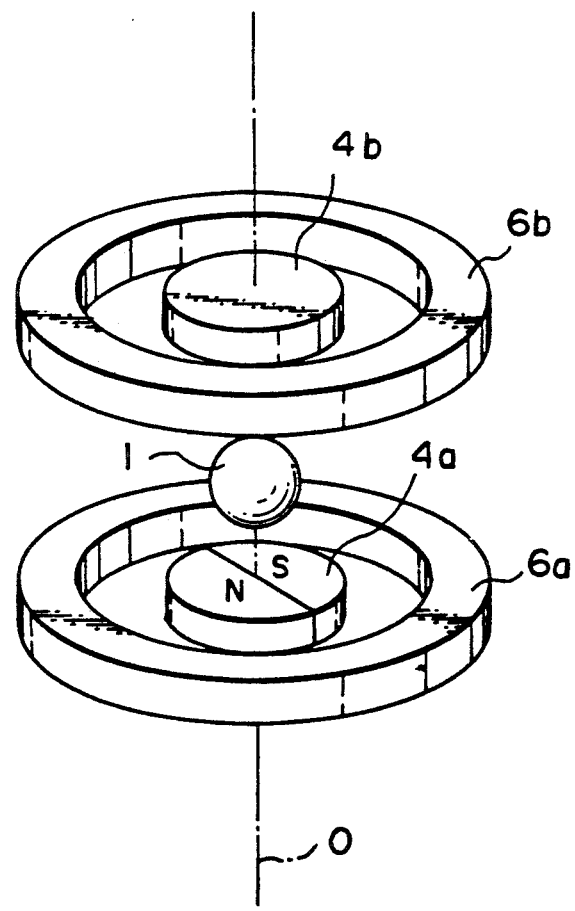
FIG. 10 shows still another form of the embodiment shown in FIG. 7.

FIG. 10 shows another form of the embodiment shown in FIG. 7, in which the disk electrode 4a is formed from a permanent magnet to replace the permanent magnet 22 and this electrode 4a is driven to rotate around the central axis O. This arrangement also enables the same advantages as those realized in the foregoing embodiment to be obtained.

Although in the foregoing embodiments the sample 1 is rotated around the central axis O, if the plane of rotation of the permanent magnet is changed to another plane, for example, the vertical plane, it is possible to rotate the sample 1 in a different direction from the above.

As has been described above, it is possible according to the present invention to rotate the sample in a controlled manner and hence to carry out an experiment in which the sample is uniformly heated in a microgravity environment.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A levitator having a position detector for detecting the position of a sample, a variable power supply whose output voltage varies in accordance with the signal output from the position detector, a pair of planar electrodes connected to two ends, respectively, of the variable power supply and disposed in opposing relation to each other, and a ring electrode disposed so as to surround each of the planar electrodes and to which a higher voltage is applied than that applied to the corresponding planar electrode from a DC power supply, said planar and ring electrodes defining means for holding the center of gravity of said sample stationary at a desired position, wherein the improvement comprises means separate from said sample for generating a magnetic field about said sample for controlling rotation of said sample about an axis through the center of gravity.

2. A levitator as set forth in claim 1 wherein said means for generating a magnetic field comprises:
   a plurality of electrodes disposed about said sample;
   an alternating power supply having a frequency and connected to said plurality of electrodes; and
   wherein the sample rotates with a number of revolutions equal to the product of the number of electrodes and the frequency of the alternating power supply.

3. A levitator as set forth in claim 1 wherein said means for generating a magnetic field comprises a permanent magnet and means for rotating said permanent magnet.

4. A levitator as set forth in claim 1 wherein said ring electrode comprises a plurality of electrodes; and
   wherein said means for generating a magnetic field comprises an alternating power supply connected to said plurality of electrodes of said ring electrode.

5. A levitator having a position detecting the position of a sample, a variable power supply whose output voltage varies in accordance with the signal output from the position detector, a pair of planar electrodes connected to two ends, respectively, of the variable power supply and disposed in opposing relation to each other, and a ring electrode disposed so as to surround each of the planar electrodes and to which a higher voltage is applied than that appliied to the corresponding planar electrode from a DC power supply, thereby holding the sample stationary at a desired position by means of said planar and ring electrodes, wherein the improvement comprises means for rotating said sample being held stationary, wherein said ring electrode comprises a plurality of arc-shaped electrodes, and said means for rotating the sample comprises an alternating power supply having an output means for providing an output voltage that changes periodically, said output means being connected to each pair of adjacent arc-shaped electrodes of said ring electrode.

6. A levitator having a position detector for detecting the position of a sample, a variable power supply whose output varies in accordance with the signal output from the position detector, a pair of planar electrodes connected to two ends, respectively, of the variable power supply and disposed in opposing relation to each other, and a ring electrode disposed so as to surround each of the planar electrodes and to which a higher voltage is applied than that applied to the corresponding planar electrode from a DC power supply, thereby holding the sample stationary at a desired position by means of said planar and ring electrodes, wherein the improvement comprises means for generating a magnetic field for rotating said sample being held stationary, wherein said means for rotating the sample comprises at least one electromagnet provided at a predetermined position outside said ring electrode to rotate said sample by means of the magnetic field of said electromagnet.

7. A levitator having a position detector for detecting the position of a sample, a variable power supply whose output voltage varies in accordance with the signal output from the position detector, a pair of palnar electrodes connected to ends, respectively, of the variable power supply and disposed in opposing relation to each other, and a ring electrode disposed so as to surround each of the planar electrodes and to which a higher voltage is appliied than that applied to the corresponding planar electrode from a DC power supply, thereby holding the sample stationary at a desired position by means of said planar and ring electrodes, wherein the improvement comprises means for generating a magnetic field for rotating said sample being held stationary, wherein said means for rotating the sample comprises means for irradiating said sample with a plurality of high-output beams from different directions to apply only rotational force to said sample.

8. A levitator having a position detector for detecting the position of a sample, a variable power supply whose output voltage varies in accordance with the signal output from the position detector, a pair of planar electrodes connected to two ends, respectively, of the variable power supply and disposed in opposing relation to each other, and a ring electrode disposed so as to surround each of the planar electrodes and to which a higher voltage is applied than that applied to the corresponding planar electrode from a DC power supply, thereby holding the sample stationary at a desired position by means of said planar and ring electrodes, wherein the improvement comprises means for rotating said sample being held stationary, wherein said means for rotating the sample comprises a permanent magnet for applying a magnetic field to the space in which said sample is located, and means for rotating said permanent magnet.

9. A levitator for levitating and rotating a sample, comprising:
   a position detector for detecting the position of said sample and for generating a command voltage on the basis of said position,
   a plurality of electrodes disposed opposing relationship, and responsive to said command voltage to generate a magnetic field therebetween for holding the center of gravity of said sample stationary in a desired position, and
   means separate from said sample for generating a magnetic field about said sample for controlling rotation of said sample about an axis through the center of gravity.

10. A levitator as set forth in claim 9 wherein said means for generating a magnetic field comprises;
    a plurality of electrodes disposed about said sample;
    an alternating power supply having a frequency and connected to said plurality of electrodes; and
    wherein the sample rotates with a number of revolutions equal to the product of the number of electrodes and the frequency of the alternating power supply.

11. A levitator as set forth in claim 9 wherein said means for generating a magnetic field comprises a permanent magnet and means for rotating said permanent magnet.

12. A levitator as set forth in claim 9 wherein said means for generating a magnetic field includes an alternating power supply connected to at least some of said plurality of electrodes, and having a frequency, whereby said sample is rotated with a number of revolutions corresponding to the number of electrodes connected to the alternating power supply and the frequency of the alternating power supply.

13. A levitator as set forth in claim 9 wherein said plurality of electrodes includes a permanent magnet; and
wherein said means for generating a magnetic field comprises means for rotating said permanent magnet.

14. A levitator for levitating and rotating a sample, comprising:
a position detector for detecting the position of said sample and for generating a command voltage on the basis of said position,
a plurality of electrodes disposed in opposing relationship, and responsive to said command voltage to generate a magnetic field therebetween, whereby said sample is held in a desired position, and
means for irradiating said sample for rotating said sample being held in said desired position.

15. A levitator for levitating and rotating a sample comprising:
a position detector for detecting the position of said sample and for generating a signal indicative of said position,
a variable power supply having output means for providing an output voltage that varies as a function of the signal generated by said position detecting means,
a pair of planar electrodes disposed in opposing relation to each other, and connected to said output means,
a pair of ring electrodes disposed so as to surround respectively each of said planar electrodes,
means for applying a direct current voltage to each of said ring electrodes, said direct current voltage higher than the voltage applied to its corresponding planar electrode by said variable power supply, whereby the center of gravity of said sample is held stationary in a desired position, and
means separate from said sample for generating a magnetic field about said sample for controlling rotation of said sample about an axis thorugh the center of gravity.

16. A levitator as set forth in claim 15 wherein said means for generating a magnetic field comprises:
a plurality of electrodes disposed about said sample;
an alternating power supply having a frequency and connected to said plurality of electrodes; and
wherein the sample rotates with a number of revolutions equal to the product of the number of electrodes and the frequency of the alternating power supply.

17. A levitator as set forth in claim 15 wherein said means for generating a magnetic field comprises a permanent magnet and means for rotating said permanent magnet.

18. A levitator as set forth in claim 15 wherein said ring electrode comprises a plurality of electrodes; and
wherein said means for generating a magnetic field comprises an alternating power supply connected to said plurality of electrodes of said ring electrode.

19. A levitator for levitating and rotating a sample comprising:
a position detector for detecting the position of said sample and for generating a signal indicative of said position,
a variable power supply having output means for providing an output voltage that varies as a function of the signal generated by said position detecting means,
a pair of planar electrodes disposed in opposing relation to each other, and connected to said output means,
a pair of ring electrodes disposed so as to surround respectively each of said planar electrodes,
means for applying a direct current voltage to each of said ring electrodes, said direct current voltage higher than the voltage applied to its corresponding planar electrode by said variable power supply, whereby said sample is held in a desired position, and
means for irradiating said sample for rotating said sample being held in said desired position.

20. A levitator for levitating and rotating a sample comprising:
a position detector for detecting the position of said sample and for generating a signal indicative of said position,
a variable power supply having output means for providing an output voltage that varies as a function of the signal generated by said position detecting means,
a pair of planar electrodes disposed in opposing relationship to each other, and connected to said output means,
a pair of ring electrodes disposed so as to surround respectively each of said planar electrodes,
means for applying a direct current voltage to each of said ring electrodes, said direct current voltage higher than the voltage applied to its corresponding planar electrode by said variable power supply, whereby said sample is held in a desired position, and
means for generating a magnetic field for rotating said sample in said desired position,
wherein said ring electrode comprises a plurality of electrodes and said means for rotating the sample comprises an alternating power supply having an output means for providing an output voltage that changes periodically, said output means being connected to each pair of adjacent arc-shaped electrodes of said ring electrode.

21. A levitator for levitating and rotating a sample comprising:
a position detector for detecting the position of said sample and for generating a signal indicative of said position, a variable power supply having output means for providing an output voltage that varies as a function of the signal generated by said position detecting means,
a pair of planar electrodes disposed in opposing relationship to each other, and connected to said output means,
a pair of ring electrodes disposed so as to surround respectively each of said planar electrodes,
means for applying a direct current voltage to each of said ring electrodes, said direct current voltage higher than the voltage applied to its corresponding planar electrode by said variable power supply, whereby said sample is held in a desired position, and
means for generating a magnetic field for rotating said sample in said desired position, wherein said means for rotating the sample comprises at least one electromagnet provided at a predetermined position outside said ring electrode to rotate said sample by means of the magnetic field of said electromagnet.

22. A levitator for levitating and rotating a sample comprising:
- a position detector for detecting the position of said sample and for generating a signal indicative of said position,
- a variable power supply having output means for providing an output voltage that varies as a function of the signal generated by said position detecting means,
- a pair of planar electrodes disposed in opposing relationship to each other, and connected to said output means,
- a pair of ring electrodes disposed so as to surround respectively each of said planar electrodes,
- means for applying a direct current voltage to each of said ring electrodes, said direct current voltage higher than the voltage applied to its corresponding planar electrode by said variable power supply, whereby said sample is held in a desired position, and
- means for generating a magnetic field for rotating said sample in said desired position,
- wherein said means for rotating the sample comprises a permanent magnet for applying a magnetic field to the space in which said sample is located, and means for rotating said permanent magnet.

23. A levitator for levitating and rotating a sample, comprising:
- a position detector for detecting the position of said sample and for generating a command voltage on the basis of said position,
- a plurality of electrodes disposed in opposing relationship, and responsive to said command voltage to generate a magnetic field therebetween for holding the center of gravity of said sample stationary in a desired position, and
- means separate from said sample for generating a changing magnetic field distribution about said sample for inducing eddy currents in said sample for controlling rotation of said sample about an axis through the center of gravity.

24. A levitator as set forth in claim 23 wherein said means for generating a magnetic field comprises:
- a plurality of electrodes disposed about said sample; and alternating power supply having a frequency and connected to said plurality of electrodes; and
- wherein the sample rotates with a numbers of revolutions equal to the product of the number of electrodes and the frequency of the alternating power supply.

25. A levitator as set forth in claim 23 wherein said means for generating a changing magnetic field distribution comprises a permanent magnet and means for rotating said permanent magnet 26. A levitator as set forth in claim 23 wherein said means for generating a changing magnetic field distribution includes an alternating power supply connected to at least some of said plurality of electrodes, and having a frequency, whereby said sample is rotated with a number of revolutions corresponding to the number of electrodes connected to the alternating power supply and the frequency of the alternating power supply.

27. A levitator as set forth in claim 23 wherein said plurality of electrodes includes a permanent magnet; and
- wherein said means for generating a changing magnetic field distribution comprises a means for rotating said permanent magnet.

28. A levitator for levitating and rotating a sample comprising:
- a position detector for detecting the position of said sample and for generating a signal indicative of said position,
- a variable power supply having output means for providing an output voltage that varies as a function of the signal generated by said position detecting means,
- a pair of planar electrodes disposed in opposing relation to each other, and connected to said output means,
- a pair of ring electrodes disposed so as to surround respectively each of said planar electrodes,
- means for applying a direct current voltage to each of said ring electrodes, said direct current voltage higher than the voltage applied to its corresponding planar electrode by said variable power supply, whereby the center of gravity of said sample is held stationary in a desired position, and
- means separate from said sample for generating a changing magnetic field distribution about said sample for inducing eddy currents in said sample for controlling rotation of said sample about an axis through the center of gravity.

29. A levitator as set forth in claim 28 wherein said means for generating a changing magnetic field distribution comprises:
- a plurality of electrodes disposed about said sample; an alternating power supply having a frequency and connected to said plurality of electrodes; and
- wherein the sample rotates with a number of revolutions equal to the product of the number of electrodes and the frequency of the alternating power supply.

30. A levitator as set forth in claim 28 wherein said means for generating a changing magnetic field distribution comprises a permanent magnet and means for rotating said permanent magnet.

31. A levitator as set forth in claim 28 wherein said ring electrode comprises an plurality of electrodes; and
- wherein said means for generating a changing magnetic field distribution comprises an alternating power supply connected to said plurality of electrodes of said ring electrode.

* * * * *

UNITED STATES PATENT AND TRADEMARK OFFICE
CERTIFICATE OF CORRECTION

PATENT NO. : 5,155,651

DATED : October 13, 1992

INVENTOR(S) : Shinicki Yoda, Kenji Itoga, Souichiro Okuda and Kazunori Ikegami It is certified that error appears in the above-identified patent and that said Letters Patent is hereby corrected as shown below:

On the title page: Item

[30] Foreign Application Priority Data

Please change Dec. 1, 1989 [JP] Japan 1-23495 to read -- Feb. 1, 1989 [JP] Japan 1-23495 --.

Signed and Sealed this

Sixteenth Day of November, 1993

*Attest:*

BRUCE LEHMAN

*Attesting Officer*      *Commissioner of Patents and Trademarks*